March 1, 1938.  G. W. BOWER  2,109,987
CIRCUIT CONTROLLING DEVICE
Filed Sept. 19, 1936   3 Sheets-Sheet 1
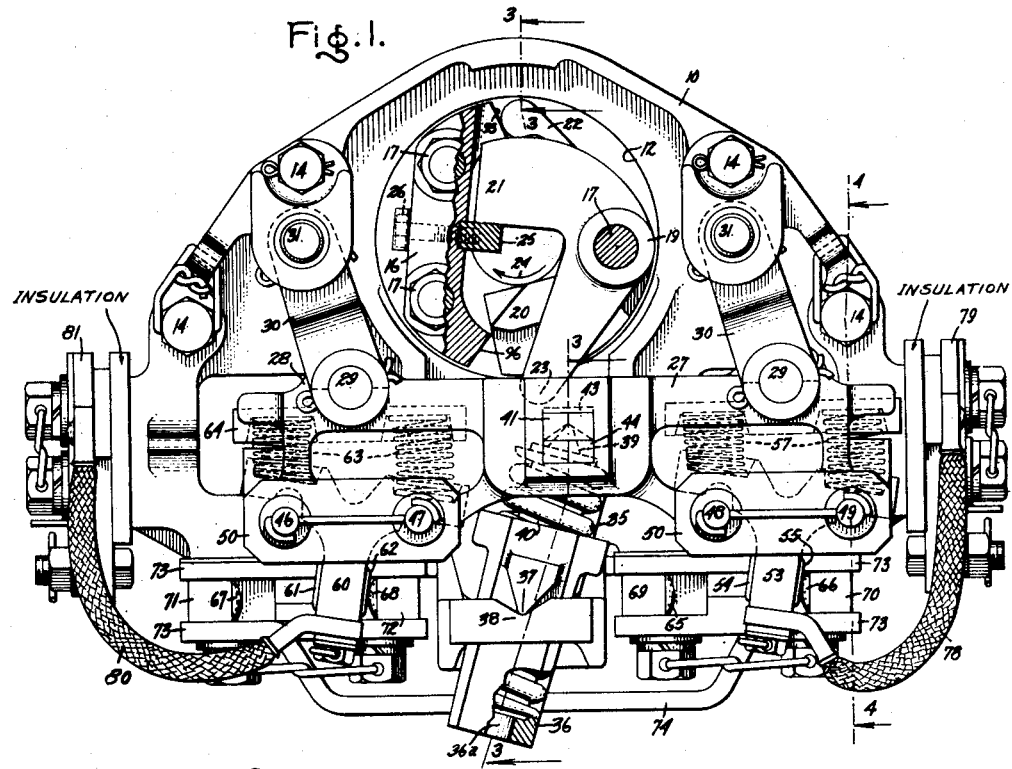
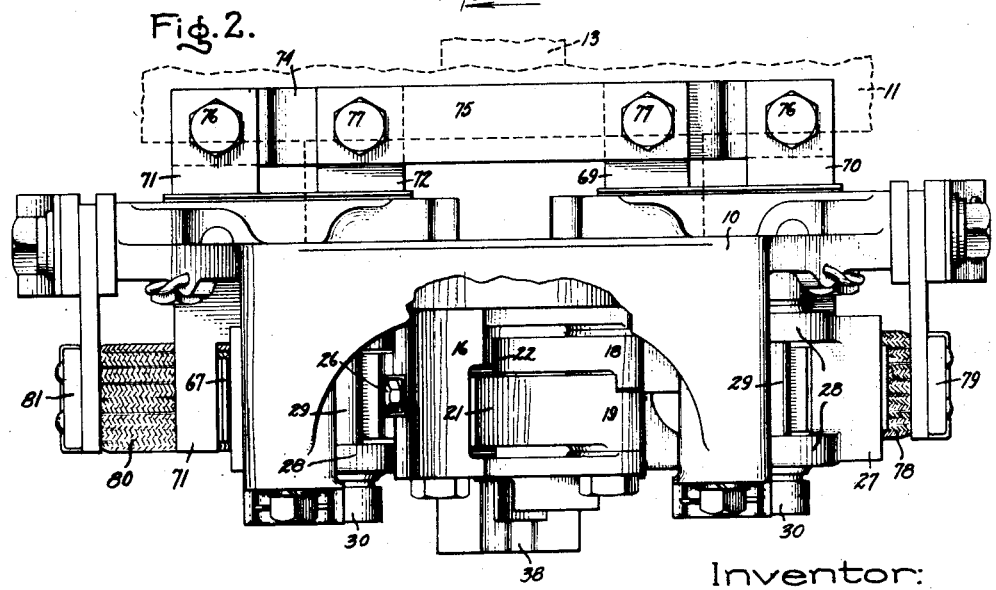
Inventor:
George W. Bower,
by Harry E. Dunham
His Attorney.

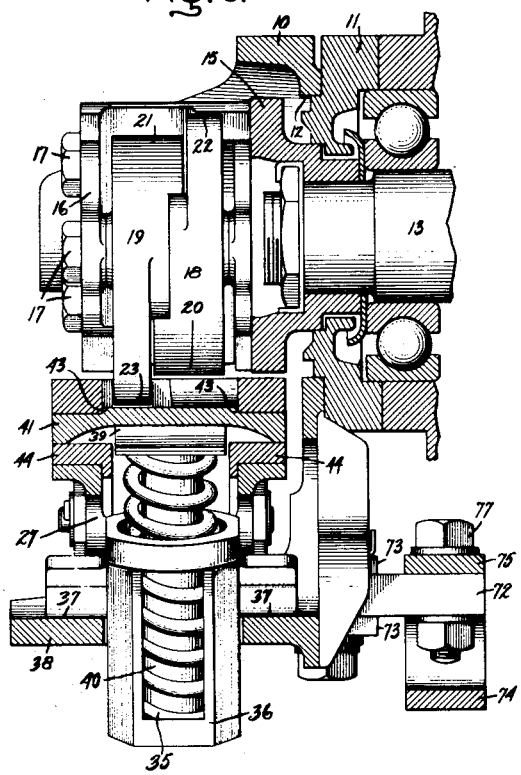
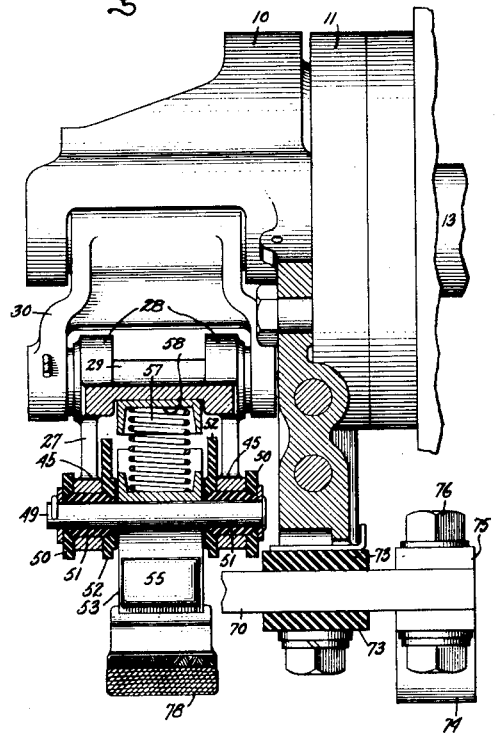
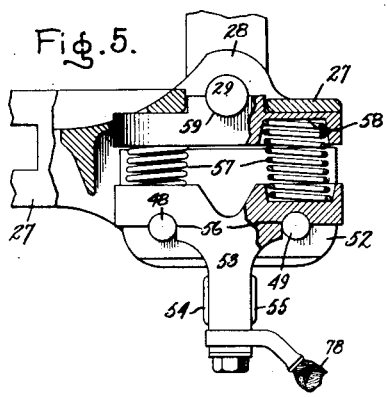

March 1, 1938.      G. W. BOWER      2,109,987
CIRCUIT CONTROLLING DEVICE
Filed Sept. 19, 1936      3 Sheets-Sheet 3
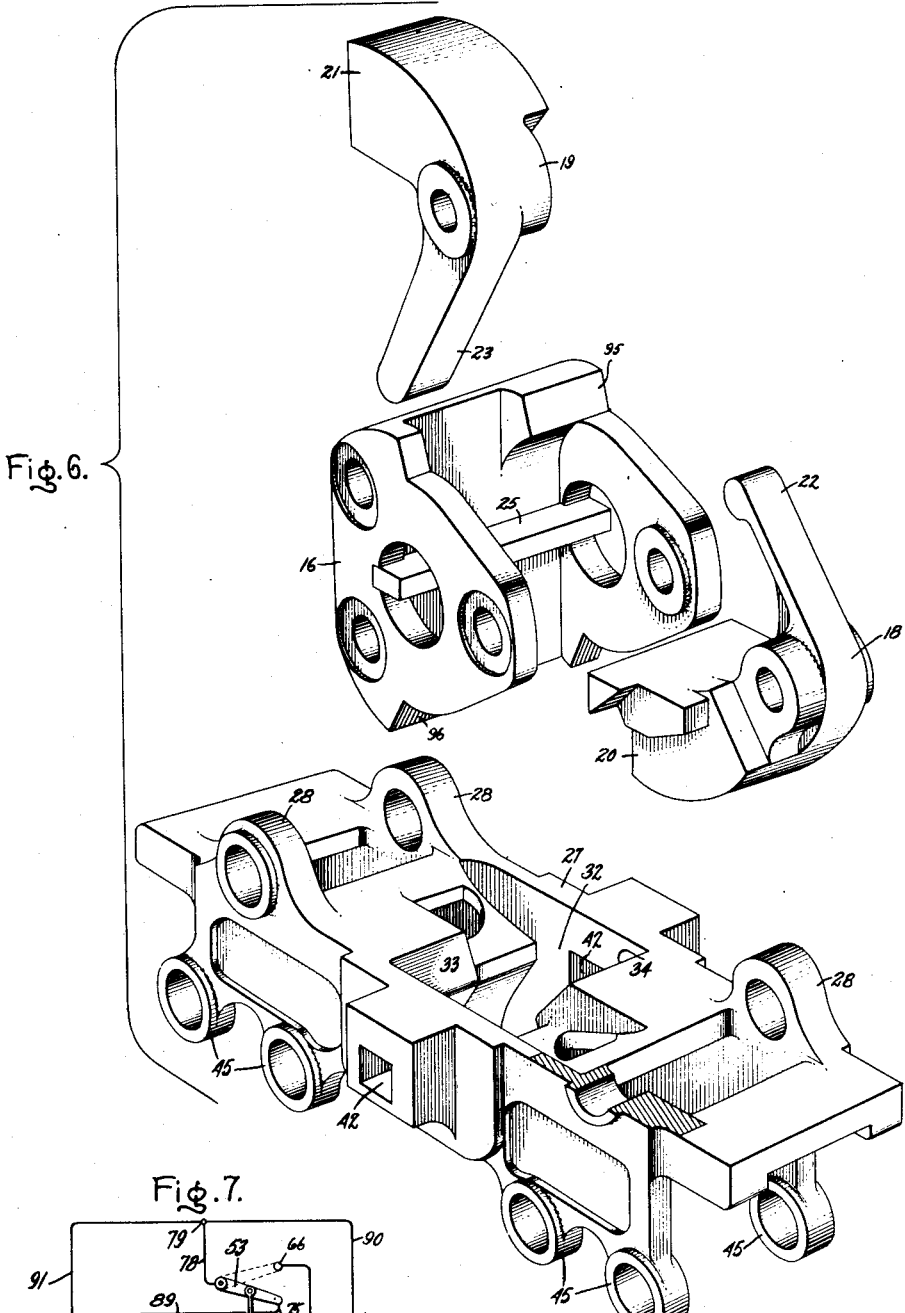
Inventor:
George W. Bower,
by Harry E. Dunham
His Attorney.

Patented Mar. 1, 1938

2,109,987

UNITED STATES PATENT OFFICE 2,109,987

CIRCUIT CONTROLLING DEVICE

George W. Bower, Harbor Creek, Pa., assignor to General Electric Company, a corporation of New York Application September 19, 1936, Serial No. 101,621

10 Claims. (Cl. 200—80)

My invention relates to circuit controlling devices, more particularly to reversing or pole changing devices for controlling an electrical circuit in accordance with the direction of rotation of a rotatable member and has for an object the provision of a simple and reliable device of this type.

Although devices embodying my invention are not limited thereto, such devices are particularly applicable to electric systems of distribution for vehicles in which an axle driven generator, whose direction of rotation changes with the direction of travel of the vehicle, is provided for charging a storage battery. In such systems, in order to ensure that the generator will always be properly connected to the battery, means must be provided for reversing the generator connections whenever the direction of rotation of the generator is reversed.

Various devices have heretofore been provided for controlling the circuit connections of a generator in systems of this type and such devices have been to a certain extent satisfactory. Because of the relatively large currents encountered in controlling the generator armature connections, such devices must be quite rugged and because of the restricted space limitations encountered, I have found that it is advantageous to mount such control devices on or adjacent to the generator housing below the generator shaft. In so far as I am aware, devices heretofore proposed are not adaptable for mounting in such a position. Much is yet to be desired, therefore, in a device of this type and accordingly it is a further object of my invention to provide a device of this character which is rugged in its construction, which is capable of carrying relatively large currents and which may be mounted on or adjacent the generator housing below the generator shaft.

In carrying out my invention in one form, I provide a plurality of operating fingers pivotally supported on a rotatable member, one end of each finger being weighted to effect pivotal movement of the finger so that the opposite end thereof extends outwardly from the lower side of the rotatable member during a portion of each revolution. Disposed below the rotatable member, I provide a movable contact actuating member which is selectively operable between two positions by one or the other of the operating fingers, depending upon the direction of rotation of the rotatable member. The weights and the fingers are so disposed that the centrifugal forces developed are effective to withdraw the operating fingers and to retain the fingers in the withdrawn position when the rotatable member is rotated above a predetermined speed.

More particularly, each of the operating fingers is shaped like a bell crank, one end comprising the weight and the other end comprising an operating portion. The fingers are disposed in different parallel planes and the contact actuating member comprises a carriage having a plurality of shoulders arranged in the respective planes of the operating fingers. Means are also provided for supporting the carriage for movement in a flat arc, the center of curvature of which is disposed on the same side of the carriage as the rotatable member so that the operating fingers are maintained in engagement with the shoulders on the carriage during a substantial portion of the movement of the carriage. Likewise, overcenter spring means are provided for selectively biasing the carriage to one or the other of its two positions and suitable contact members are resiliently supported on the carriage for selective wiping engagement with cooperating stationary contacts.

For a more complete understanding of my invention, reference should now be had to the drawings in which Fig. 1 is an elevational view, partly in section, of a circuit controlling device embodying my invention; Fig. 2 is a plan view of the device shown in Fig. 1 with certain parts broken away and others shown in broken lines more clearly to illustrate the constructional details; Fig. 3 is a sectional view, taken along line 3—3 of Fig. 1; Fig. 4 is a similar sectional view, taken along line 4—4 of Fig. 1; Fig. 5 is a fragmentary sectional view, illustrating the movable contact structure; Fig. 6 is a detail view in exploded perspective of certain operating parts of the control device; and Fig. 7 is a circuit diagram illustrating one manner in which my improved control device may be applied to a battery charging system.

Referring now to the drawings, I have shown my invention as applied to a circuit controlling device comprising a frame 10 adapted to be secured to a portion of the generator housing 11 (Figs. 3 and 4) the frame 10 being provided with an aperture 12 through which the shaft 13 of the generator extends when the frame 10 is secured to the generator housing by suitable bolts 14. As shown in Fig. 3, the end of the generator shaft is provided with a flange 15, to which is secured a rotatable member or rotor 16 by suitable bolts 17, one of the bolts 17 serving also as a pivot pin for a pair of operating members 18 and 19. These operating members 18 and 19, as shown best in Fig. 6, are substantially L-shaped and resemble bell cranks, one end of each member comprising a weighted portion 20 and 21 respectively and the other end of each bell crank comprising an operating finger 22 and 23 respectively.

The operating members 18 and 19 are mounted in different parallel planes on their pivot pin 17 and are so arranged that the weights 20 and 21 effect pivotal movement of the members 18 and 19 to cause the fingers 22 and 23 to extend outwardly from the lower side of the rotatable member 16 during a portion of each revolution. Likewise, it will be seen that the members 18 and 19 are arranged to move in opposite directions about their pivot, that is, the weight 21, when the rotatable member approaches the position shown in Fig. 1, causes the operating member 19 to move in a counterclockwise direction about its pivot so that the operating finger 23 extends outwardly as shown, and it will be apparent that when the rotatable member 16 reaches a position 180 degrees from the position shown in Fig. 1, the direction of rotation being as shown by the arrow 24, the weight 20 will effect clockwise movement of the arm 18 about its pivot so as to move the operating finger 22 outwardly from what will then be the lower side of the rotatable member 16. A suitable stop member 25, which comprises a bar secured to the rotatable member 16 by a screw 26 (Fig. 1), is arranged for engagement by the weights 20 and 21 so as to limit the outward movement of the operating fingers 22 and 23 as the rotatable member 16 is rotated.

Disposed below the rotatable member 16, I provide a contact actuating carriage 27 (Fig. 6), the upper side of which is provided with a plurality of ears 28 which form supports for a pair of bearing pins 29 (Fig. 1), the bearing pins 29 extending through suitable bifurcated operating links 30, shown best in Fig. 4, the upper ends of which are carried by bearing pins 31 supported by the frame 10. Thus, it will be seen that the carriage 27 is supported by the links 30 for movement in an arc, the center of curvature of the arc being on the same side of the carriage as the rotatable member 16 for a purpose which will be more fully described hereinafter. Intermediate the ears 28 the upper side of the carriage 27 is provided with an irregularly shaped recess 32 into which the operating fingers 22 and 23 extend when moved outwardly from the rotatable member 16 by the weights 20 and 21 respectively, the opposite sides of the recess 32 being formed to provide shoulders 33 and 34, respectively, disposed in the paths of movement of the fingers 23 and 22 for engagement by the fingers.

In order to bias the carriage 27 to its extreme left-hand or extreme right-hand position, as viewed in Fig. 1, I provide overcenter spring means comprising a coil spring 35, the lower end of which rests in a spring support 36, which includes a pair of knife edge bearings 37 extending outwardly from the sides thereof and adapted to rest in V-shaped supporting bearings formed in a support 38 which extends outwardly from the frame 10, the support 38 being apertured as shown best in Fig. 3, to permit the spring support 36 to extend therethrough. The upper end of the coil spring 35 engages a knife edge bearing member 39, which is supported on a tubular guide post 40 disposed within the coil spring 35, the upper edge of the bearing member 39 being arranged to engage a V-shaped bearing in a pin 41 which extends crosswise of the carriage 27 with its outer ends disposed in suitable apertures 42 formed in the walls of the carriage. As shown best in Fig. 3, this bearing pin 41 is provided with suitable shoulders 43 to prevent longitudinal movement of the pin and a pair of supporting shoes 44 are provided, one of the shoes being disposed in each of the apertures 42 so as to retain the bearing pin 41 in the position shown best in Figs. 1 and 3.

In Fig. 1, the carriage 27 is shown in its extreme right-hand position and it will be apparent that when the carriage is moved in a left-hand direction, the overcenter spring 35 will be compressed and carried over-center, the bias of the spring being reversed as soon as the knife edge bearing 39 passes over the knife edge bearings 37, whereupon the spring 35 will bias the carriage 27 towards its extreme left-hand position.

Extending downwardly from the lower side of the carriage 27 I provide a plurality of pairs of supporting ears 45 which carry a plurality of bearing pins 46, 47, 48 and 49, respectively. As shown best in Fig. 4, these bearing pins are insulated from the supporting ears 45 by suitable insulating members 50, 51 and 52.

Supported on the bearing pins 48 and 49 is a substantially T-shaped contact member 53 (Fig. 5) the stem portion of which carries a plurality of contacts 54 and 55 and the cross portion of which is provided with a plurality of open bearings 56 for engaging the bearing pins 48 and 49. Normally, the contact member 53 is biased to the midposition shown in Fig. 5 by a plurality of coil springs 57, the opposite ends of which engage a spring seat 58 which abuttingly engages portions of the frame 27 and is held in the position shown in Fig. 5 by engagement of an open bearing 59 with the bearing pin 29. Similarly, the bearing pins 46 and 47 support a tiltable contact member 60 which carries a pair of contacts 61 and 62 and which is resiliently held in engagement with the bearing pins 46 and 47 by a pair of coil springs 63, a suitable spring support 64 being provided for the coil springs.

Disposed on opposite sides of the tiltable contact 53 for selective engagement by the contacts 54 and 55, I provide a pair of stationary contacts 65 and 66, similar contacts 67 and 68 being arranged on opposite sides of the contact member 60 for selective engagement by the contacts 61 and 62. The stationary contacts 65 to 68 inclusive are respectively supported on conductor bars 69, 70, 71 and 72 which, as shown best in Fig. 4, extend rearwardly and are supported on the frame 10 between suitable insulating members 73. The stationary contacts 66 and 67 are electrically connected together, for a purpose which will be more fully described hereinafter, in connection with the circuit diagram shown in Fig. 7, by a bus bar 74 which is electrically connected to the supporting conductors 70 and 71. Similarly, the stationary contacts 65 and 68 are electrically connected together by a bus bar 75 which is secured to the rear ends of the conductors 69 and 72.

It will be apparent, of course, that the bolts 76 and 77 (Fig. 2), which serve to connect the bus bars 74 and 75 to the conductors 69 and 72 inclusive, may be used for connecting the control device in the external circuit to be controlled and, as shown best in Fig. 1, the movable contact member 53 is connected by a flexible conductor 78 to a suitable terminal member 79 supported on and insulated from the frame 10, a similar flexible conductor 80 being provided for connecting the movable contact member 60 to a similar terminal member 81.

With the above constructional details clearly in mind, it is believed that a complete understanding of my invention may now be had from a description of the operation. Referring first to Fig. 7, in which similar parts represented diagrammatically are represented by similar reference numerals, I have shown somewhat diagrammatically my control device as applied to a battery charging circuit in which a generator provided with an armature 82, a shunt field 83, and a series field 84 is arranged to charge a storage battery 85, the circuit connections of the generator armature being controlled by my improved control device so as to reverse the connections of the generator armature each time that the direction of rotation of the generator is reversed.

With the generator armature rotating in the direction indicated by the arrow 86, it will be assumed that the brush 87 of the generator is the positive terminal and brush 88 is the negative terminal. Accordingly, current will flow from the armature of the generator through the brush 87, the series field winding 84, and the conductor 89 to the bus bar 75 of the control device. With the movable contacts of the control device in the position shown in Fig. 7, the current will flow from the bus bar 75 through the contacts 65 and 54, which are now in engagement, to the movable contact member 53 and from the movable contact member 53 by way of the flexible conductor 78 to the terminal 79 which is connected to the positive side of battery 85 by a conductor 90 and to the shunt field winding 83 by a conductor 91. Accordingly, the current divides part of the current flowing through the battery 85 and part through the shunt field 83 by way of the conductors 90 and 91 and by the conductors 92 and 93 to the terminal 81. From the terminal 81 the current then flows through the flexible conductor 80 to the movable contact member 60 and through the contacts 61 and 67, which are now in engagement, to the common bus bar 74. This bus bar 74 is connected by means of the conductor 94 to the negative terminal 88 of the generator and accordingly the current returns to the generator armature by way of this conductor 94 and brush 88.

It will now be assumed that the generator having been brought to a stand-still, is rotated in a direction opposite to that indicated by the arrow 86. As will be more fully described hereinafter, rotation of the generator in this direction immediately effects operation of the control device to the position indicated in dotted lines in Fig. 7 so as to reverse the armature connections of the generator and thus connect the brush 88, which is now positive, to the terminal 79, the negative brush 87 being connected to the terminal 81. The circuit from the brush 88 to the terminal 79 may now be traced through the conductor 94, the bus bar 74, the movable contact 53, and by way of the flexible conductor 78 to the terminal 79, and the circuit from the terminal 81 to the negative brush 87 may now be traced through the flexible conductor 80, the movable contact 60, the bus bar 75, and by way of the conductor 89 and the series field winding 84, to the brush 87.

Referring now to Fig. 1, the manner in which my improved control device automatically accomplishes the above described circuit changes in accordance with a reversal in the direction of rotation of the generator armature will now be described. In Fig. 1, the movable carriage 27 is shown in its extreme right-hand position, which position corresponds to the dotted position shown in Fig. 7 and it will be assumed that the generator now begins to rotate in the direction indicated by the arrow 24 in Fig. 1. As hereinbefore described, the weight 21 moves the operating finger 19 about its pivot in a counterclockwise direction as the rotatable member 16 approaches the position shown in Fig. 1 so that the operating finger 23 extends outwardly from the lower side of the rotatable member and into the recess 32 in the carriage 27. The various parts are shown in Fig. 1 at the instant when the tip of the finger 23 has just engaged the shoulder 33 on the carriage 27. Since the stop 25 prevents further counterclockwise movement of the operating member 19, it will be apparent that upon continued rotation of the rotatable member 16, the operating finger 23 urges the carriage 27 in a left-hand direction. As the carriage moves in this direction, the bias of the overcenter spring 35 is reversed, when the knife-edge bearing 39 passes over the knife-edge bearings 37, and the carriage 27 will thereupon be operated by the overcenter spring 35 to its extreme left-hand position so as to disengage the contacts 55 and 62 from the stationary contacts 66 and 68 respectively and to engage the contacts 54 and 61 with the stationary contacts 65 and 67 respectively.

As hereinbefore described, the carriage 27 moves in an arc, the center of curvature of which is on the same side of the carriage as the rotatable member 16. Accordingly, the carriage follows the path of movement of the finger 23 to some extent and the finger 23 is thus maintained in engagement with the shoulder 33 for a larger portion of the movement of the carriage 27 than would be possible if the carriage moved in a straight line or moved in an arc having its center of curvature on the opposite side of the carriage from the rotatable member 16.

As soon as the contacts 55 and 62 are disengaged from the stationary contacts 66 and 68 respectively, it will be apparent that the resilient means comprising the coil springs 57 and 63 will operate the contact members 53 and 60 to the respective midpositions shown in Fig. 5. The arrangement of the stationary contacts 65 to 68 inclusive relative to the contact members 53 and 60 is such that with the contact members in the midposition the contacts 54 and 61 will engage the stationary contacts 65 and 67 respectively before carriage 27 has reached its extreme left-hand position. Engagement of these contacts, however, will not prevent further movement of the carriage 27 since the overcenter spring 35 exerts a considerably greater force than the coil springs 57 and 63. Accordingly, the carriage 27 continues to move in a left-hand direction and the contact members 53 and 60 are tilted on the bearing pins 46 to 49 inclusive to a position opposite from the position shown in Fig. 1; that is, the contact members 53 and 60 will rest on the bearing pins 46 and 48 respectively and will move away from the bearing pins 47 and 49 respectively so as to compress the right-hand ones of the coil springs 57 and 63. Thus, a wiping action of the contacts is obtained and a uniform contact pressure maintained between the contacts with the carriage 27 in either of its extreme positions.

When the carriage 27 reaches its extreme left-hand position, the proper circuits will be completed, as described in connection with Fig. 7, and as the generator continues to rotate in the direction indicated by the arrow 24 in Fig. 1, the fingers 22 and 23 will be operated by their associated weights 20 and 21, so that the fingers extend outwardly from the rotatable member 16 during a portion of each revolution. With the carriage in this extreme left-hand position, however, the finger 23 will pass freely through the recess 32 without engaging the shoulder 33, and the finger 22 will engage the upper side of the carriage 27 adjacent the shoulder 34. This engagement of the finger 22 with the carriage 27, however, has no effect other than to move the finger 22 inwardly against the bias of weight 20 and to cause a slight clicking sound once during each revolution.

This inward and outward operation of the fingers 22 and 23 continues only so long as the generator rotates below a predetermined speed. As soon as the speed of the generator is increased above this predetermined speed, the weights 20 and 21 are effected by the centrifugal forces developed so as to withdraw the fingers 22 and 23 and to maintain them at all times within the outermost periphery of the rotatable member 16. The inward movement of the fingers 22 and 23 under the centrifugal force developed is limited by engagement of the finger 22 with a shoulder 95 formed on the rotatable member 16 and, similarly, inward movement of the finger 23 is limited by engagement of the finger with the shoulder 96 formed on the rotatable member 16.

So long as the generator continues to rotate in this direction, the movable carriage 27 will remain in its extreme left-hand position and if the generator is stopped and then started again in the same direction, no movement of the carriage 27 will be effected and the slight clicking action caused by engagement with the finger 22 with the upper side of the carriage 27 will continue only so long as the generator rotates below the predetermined speed.

If, now, the generator is brought to a standstill and started in the opposite direction, the finger 22 will engage the shoulder 34 and will move the carriage 27 in a right-hand direction in a manner similar to that described above, thereby reversing the bias exerted by the overcenter spring 35 and effecting a snap movement of the carriage 27 to the extreme right-hand position shown in Fig. 1. With the carriage in this position, and the rotatable member 16 rotating in a direction opposite to the direction indicated by the arrow 24, it will be apparent that the operating finger 23 engages the upper side of the carriage adjacent the finger 33 and causes a slight clicking sound which continues only so long as the generator rotates below the predetermined speed.

It may, in some cases, be desirable manually to operate the carriage 27 between its extreme positions. Accordingly the spring support 36 is provided with an aperture 36a in alignment with the tubular guide post 40 into which an operating bar or lever may be inserted to operate the spring support and the guide post about the knife edge bearings 39 so as to move the spring 35 overcenter.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. A circuit controlling device comprising a rotatable member, a pair of independently movable operating fingers mounted for movement relative to said member, weights on said fingers for causing said fingers to extend outwardly from the lower side of said member during portions of each revolution thereof so long as said member is rotated below a predetermined speed, said weights being arranged to withdraw said extending fingers and to retain said fingers in withdrawn position when said member is rotated above said predetermined speed, and means disposed below said rotatable member for selective operation by said fingers between two positions depending upon the direction of rotation of said rotatable member.

2. A circuit controlling device comprising a rotatable member, a pair of independently movable bell-crank members pivotally mounted on said rotatable member, one end of each of said bell-cranks comprising a weight and the other end of each bell-crank comprising an operating finger, said weights being effective to move said operating finger outwardly from said rotatable member during a portion of each revolution when said rotatable member is rotated below a predetermined speed, and said weights being effective under the centrifugal forces developed to move said fingers inwardly and to retain said fingers in withdrawn position when said rotatable member is rotated above said predetermined speed, and means disposed below said rotatable member for selective operation between two positions by said fingers in accordance with the direction of rotation of said rotatable member.

3. A circuit controlling device comprising a rotatable member, a pair of operating fingers pivotally mounted on said member for pivotal movement in different parallel planes as said member is rotated, weights on said fingers for causing said fingers to extend outwardly from the lower side of said rotatable member during portions of each revolution thereof, said weights being arranged to move said fingers in opposite directions about their pivots to cause outward movement thereof, means for limiting the outward movement of said fingers, a switch actuating member movable between two positions disposed below said rotatable member, and shoulders on said switch actuating member arranged in the respective planes of said fingers whereby one of said fingers engages one of said shoulders to operate said switch actuating member to one position upon rotation of said rotatable member in one direction, and the other of said fingers engages another of said shoulders to operate said switch actuating member to a second position upon rotation of said rotatable member in the opposite direction.

4. A circuit controlling device comprising a rotatable member, a pair of operating fingers pivotally mounted on said member for pivotal movement in different parallel planes as said member is rotated, weights on said fingers for causing said fingers to extend outwardly from the lower side of said rotatable member during portions of each revolution, said weights being arranged to move said fingers about their pivots in opposite directions and said fingers extending from opposite sides of said rotatable member when moved outwardly, stop means for engaging said weights to limit the outward movement of said fingers, a switch actuating member disposed below said rotatable member for movement between two positions, and shoulders on said switch actuating member arranged in the respective planes of said fingers whereby one of said fingers engages one of said shoulders to operate said switch actuating member to one position upon rotation of said rotatable member in one direction, and the other of said fingers engages another of said shoulders to operate said switch actuating member to a second position upon rotation of said rotatable member in the opposite direction.

5. A circuit controlling device comprising a rotatable member, a pair of bell-crank members mounted on said rotatable member for pivotal movement in different planes, one end of each of said bell-cranks comprising a weight and the other end of each bell-crank comprising an operating finger, said weights being affected by gravity to move said operating fingers outwardly from the lower side of said rotatable member during portions of each revolution when said rotatable member is rotated below a predetermined speed, stop means for limiting the outward movement of said members, a contact actuating member disposed below said rotatable member for movement between two positions, and shoulders on said actuating member arranged in the respective planes of said operating fingers for engagement by said extending fingers, whereby said fingers selectively move said actuating member between said two positions in accordance with the direction of rotation of said rotatable member, said weights being affected by the centrifugal forces developed to withdraw said fingers and to retain said fingers in withdrawn position when said rotatable member is rotated above said predetermined speed.

6. In a control device, the combination of a rotatable member, operating fingers carried by said member arranged to extend outwardly therefrom, a movable carriage disposed adjacent said rotatable member for movement between two positions, shoulders on said carriage arranged for selective engagement by one or the other of said fingers depending upon the position of said carriage and the direction of rotation of said rotatable member, the engagement of said fingers with said shoulders being effective selectively to move said carriage from between two positions, and means supporting said carriage for movement in an arc having its center of curvature on the side of said carriage adjacent said rotatable member, whereby said fingers engage said shoulders during a substantial portion of the movement of said carriage.

7. A circuit controlling device comprising a rotatable member, operating fingers carried by said member arranged to extend outwardly therefrom, a movable carriage disposed adjacent said rotatable member for movement between two circuit controlling positions, overcenter spring means for selectively biasing said carriage to either of said two positions, shoulders on said carriage arranged for selective engagement by one or the other of said fingers depending upon the direction of rotation of said rotatable member and the position occupied by said carriage, the engagement of said fingers with said shoulders being effective to move said carriage from its biased position to reverse the bias of said overcenter spring means, whereupon said carriage is operated with a snap action to its second position, means supporting said carriage for movement in an arc having its center of curvature on the side of said carriage adjacent said rotatable member, whereby said fingers engage said shoulders during a substantial portion of the movement of said carriage, and control means controlled by said movement of said carriage.

8. In a control device, the combination of a rotatable member, a pair of independently movable operating fingers pivotally mounted on said member, weights on said fingers for causing said fingers to extend outwardly from the lower side of said member during portions of each revolution when said member is rotated at less than a predetermined speed, stop means for limiting the outward movement of said fingers, a movable carriage disposed below said rotatable member, shoulders on said carriage arranged for selective engagement by one or the other of said fingers, depending upon the position of said carriage and the direction of movement of said rotatable member, the engagement of said fingers with said shoulders being effective to move said carriage between said positions in accordance with the direction of rotation of said rotatable member, and means for supporting said carriage for movement in an arc having its center of curvature above said carriage, whereby said fingers engage said shoulders during a substantial portion of the movement of said carriage.

9. A circuit controlling device comprising a rotatable member, a pair of bell-crank members mounted on said rotatable member for pivotal movement in different planes, one end of each of said bell-cranks comprising an operating finger and the other end of each bell-crank comprising a weight for moving the associated operating finger outwardly from said rotatable member during a portion of each revolution when said rotatable member is rotated below a predetermined speed, stop means for limiting the outward movement of said fingers, a movable carriage disposed adjacent said rotatable member for movement between two positions, shoulders on said carriage arranged for selective engagement by one or the other of said fingers depending upon the position of said carriage and the direction of rotation of said rotatable member, said fingers thereby selectively operating said carriage between said two positions in accordance with the direction of rotation of said rotatable member, means for supporting said carriage for movement in an arc having its center of curvature on the side of said carriage adjacent said rotatable member, whereby said fingers engage said shoulders during a substantial portion of the movement of said carriage, and contact means controlled by said carriage, said weights being affected by the centrifugal forces developed when said rotatable member is rotated above said predetermined speed to move said operating fingers inwardly.

10. A circuit controlling device comprising a rotatable member, operating fingers carried by said member arranged to extend outwardly therefrom, a movable carriage disposed adjacent said rotatable member for movement between two circuit controlling positions, overcenter spring means for selectively biasing said carriage to either of said two positions, shoulders on said carriage arranged for selective engagement by one or the other of said fingers, depending upon the direction of rotation of said rotatable member and the position occupied by said carriage.

the engagement of said fingers with said shoulders being effective to move said carriage from its biased position to reverse the bias of said overcenter spring means, whereupon said carriage is operated with a snap action to its second position, a tiltable contact member on said carriage, resilient means normally biasing said contact member to a midposition, and cooperating stationary contacts disposed on opposite sides of said contact member for selective engagement thereby as said carriage moves between said two positions, said tiltable contact being arranged to engage said stationary contact before said carriage reaches its extreme positions, said overcenter spring means being effective to complete the movement of said carriage against the force of said resilient means, whereby said contact member is tilted and a wiping action is obtained between the contacts.

GEORGE W. BOWER.